United States Patent Office 3,265,163
Patented August 9, 1966

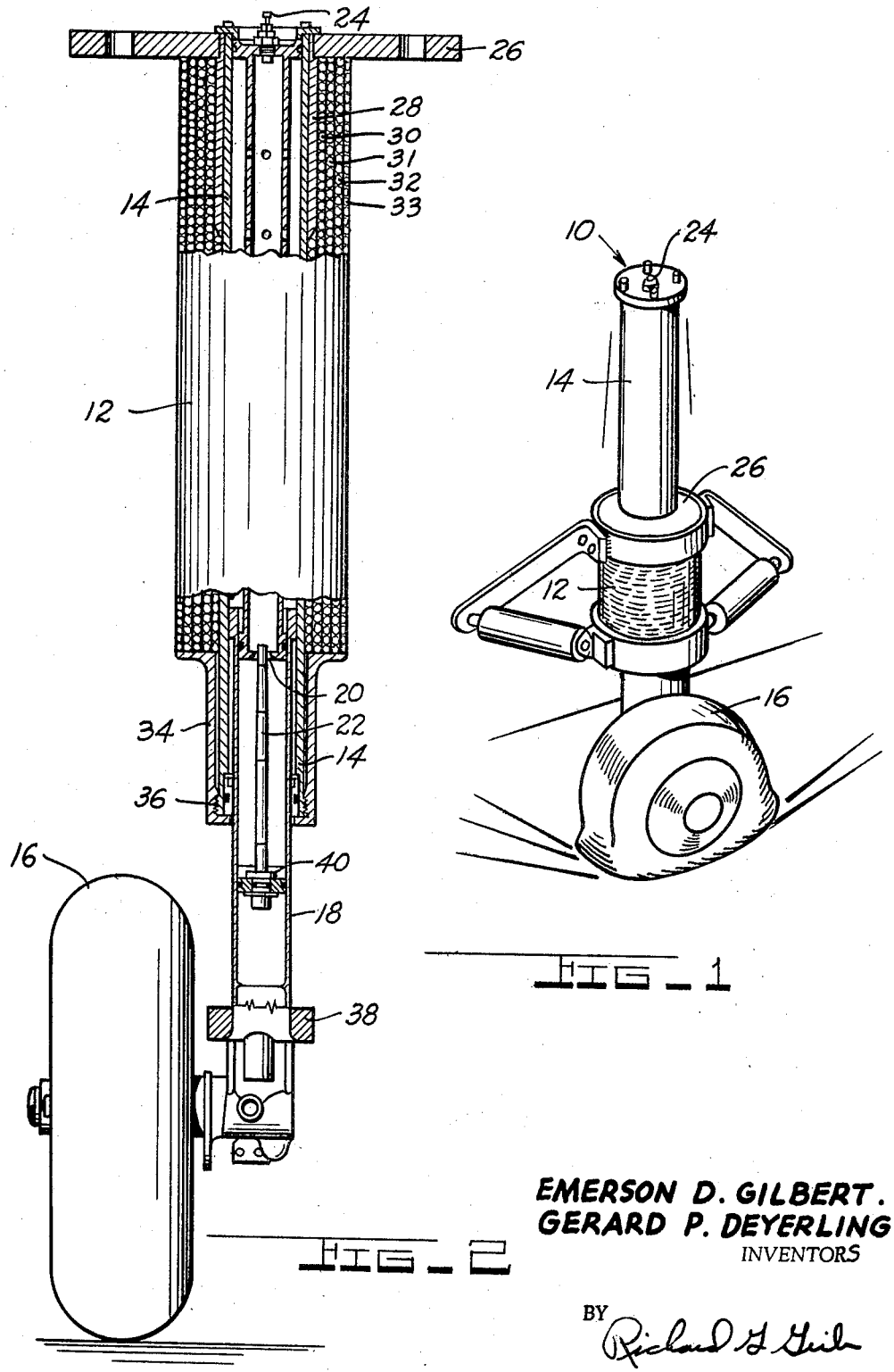

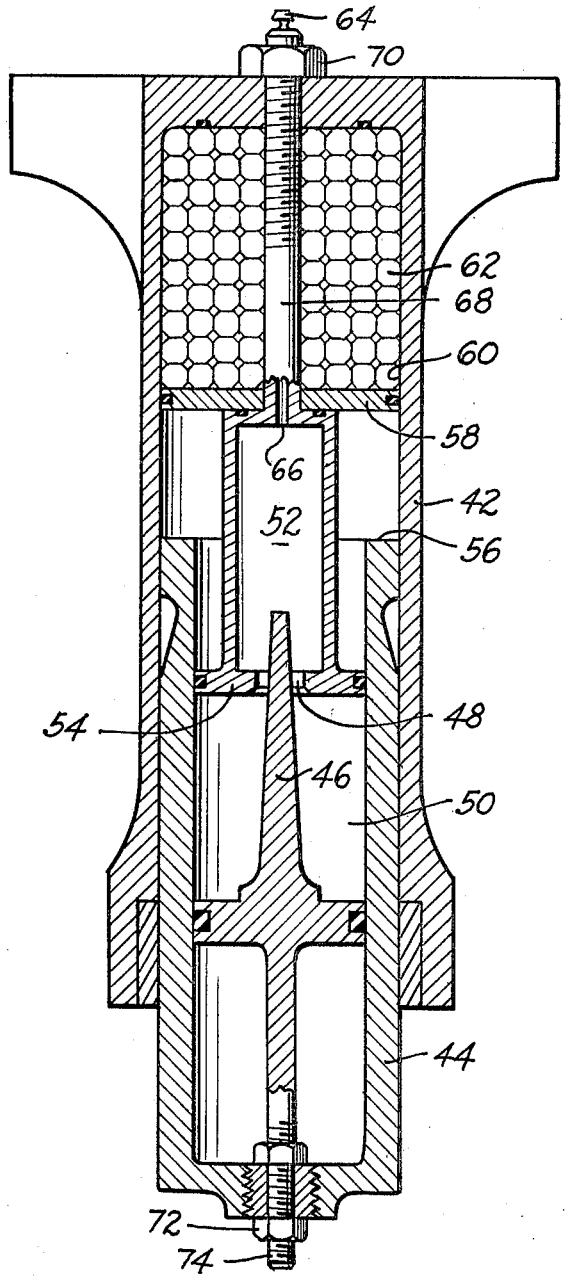
FIG_3

3,265,163
SHOCK ABSORBER
Emerson D. Gilbert and Gerard P. Deyerling, South Bend, Ind., assignors to The Bendix Corporation, South Bend, Ind., a corporation of Delaware
Filed Mar. 5, 1964, Ser. No. 349,717
6 Claims. (Cl. 188—88)

This invention relates to a means for mounting a shock absorber to surrounding structure which will incorporate means to provide for protection during the application of excessive loads to the shock absorber.

Hard landings of aircraft, for example, have resulted in damage to aircraft shock absorbers of a conventional type and with the extremely high decelerating forces being transmitted to the vehicle, it is quite possible to create extensive damage to the aircraft. It should be noted that while we speak in terms of aircraft, this could also be true in land vehicles which are heavily laden and/or which are operating over rough or unimproved terrain. In either event the application of excessive loads may well be the result of system energy exceeding the capacity of the existing shock absorption units thereby culminating in a "bottoming" condition for the shock absorbers. In the past metering pin contour normally controls the maximum load that may develop in a shock absorber. However, as it is almost impossible to predict every situation involving the usage of present-day vehicles, we have found it desirable to provide a means to absorb additional energy in that portion of travel that remains between a bottom out shock absorber and the contact of the undersurface of the associated vehicle with the ground.

The energy absorbing capabilities of shock absorbers are limited by weight and space consideration as will appear obvious to those skilled in the art to which our invention relates. Normally, additional energy absorbing capacity can only be attained by increases in shock absorber or strut stroke—"g" loadings remaining constant. However, an increase in stroke can only be attained at the sacrifice of space and weight. It is, therefore, a principal intent of our invention to provide a shock absorber which incorporates increased energy absorption capacity without an attendant increase in length to enable higher vertical sink speeds without vehicle damage.

Another object of our invention is to provide a mechanical type shock absorber in series with a conventional hydraulic type.

It is another object of our invention to combine a shock absorber of a conventional hydraulic type with a mechanical type shock absorber in such a manner that the latter is inoperative during normal load applications to the hydraulic shock absorber.

It is a still further object to provide an additional energy absorption capability for a shock absorber by combining a conventional shock absorber with a crushable honeycomb energy absorber that is operative only upon the bottoming out of the conventional shock absorber.

It is a still further object to provide a compound shock absorber wherein the crushable honeycomb energy absorber is arranged to provide vertical column strength during normal operation of the conventional shock absorber.

Other objects and advantages will be apparent from the following detailed description of the invention and from the appended drawings and claims.

In the drawings:

FIGURE 1 is a perspective view of a shock absorber embodying the compound features of our design showing the shock absorber undergoing excessive loading;

FIGURE 2 is a broken, side view of a shock absorber of the type shown in FIGURE 1; and FIGURE 3 is a cross-sectional view of a still further form which a shock absorber of our design may take.

More particularly with regard to the drawings, we propose to provide structure having additional energy absorption capability by combining a conventional shock absorber 10 with a crushable honeycomb energy absorber 12 encased around an outer cylinder 14, which in FIGURE 1 is pictorially presented as undergoing an excessive load application where an associated wheel 16 is flattened.

Normally the shock absorber appears as that shown by FIGURE 2 whereupon normal loading causes an inner cylinder 18 to stroke in the outer cylinder 14 with the kinetic energy due to vertical velocity being absorbed by metering oil or other hydraulic fluid through an orifice 20 past a metering pin 22. The hydraulic shock absorber depicted is of a conventional air over hydraulic type with the air charge being admitted through a conventional fitting 24.

The conventional shock absorber 10 is mounted to surrounding structure by a plate 26 adjacent the top thereof and it is reciprocably arranged in said plate and axially located by a depending tube 28 to allow for the projection upwardly of said plate as shown in FIGURE 1 and to provide support for transverse loading. Around the outer cylinder 14 and the collar 28 we have provided a plurality of annular honeycomb rings 30, 31, 32 and 33 which are clamped between the plate 26 and a lower collar 34 which is threaded to the outer cylinder 14 as at 36.

As seen the inner cylinder 18 is provided with a ring 38 adjacent the lower end thereof, which ring is arranged to abut upon the lower collar 34 upon the "bottoming" of the conventional shock absorber 10, but prior to the contact of the lower face 40 of the metering pin with the orifice 20 to prevent impacting damage on either of these parts.

The honeycomb rings 30 through 33 are shown in the drawings as having their cores horizontal with respect to the axis of the conventional shock absorber. However, this is done for purposes of illustration only and it should be noted that the walls of the honeycomb rings will normally have their axis parallel with the axis of the conventional shock absorber in order to provide the necessary column strength for the compound unit. We have also found that Truss-Grid as produced by the General Grid Corporation, Army Chemical Center, Maryland also is applicable to our compound shock absorber.

The mode of operation when a high vertical velocity loading occurs is as follows:

The conventional shock strut 10 compresses until the ring 38 of the inner cylinder 18 bottoms on the lower collar or crush plate 34 threaded to the outer cylinder 14. The outer cylinder now rises within the support or uppermost collar 28 with the lower crush plate 34 compressing the honeycomb retained by the plate 26. It will be obvious after any landing whether or not the honeycomb or mechanical shock absorber has been actuated. If upon observation replacement is required, it may be done by removing the plate 26, which may be of a split ring type, and dropping the shock absorber out of the crushed honeycomb portion. New honeycomb rings or billet assembly may be placed over the outer cylinder with the plate 26 being reinstalled. The force required to crush the honeycomb which may be aluminum or of similar metal composition must always be greater than that transmitted by the conventional shock strut to the support structure. This requirement is no hardship because it is desirable to increase the deceleration of the vehicle body to provide a large energy absorption rate over a reasonable stroke. As mentioned above, due to the column strength of the honeycomb which in some part is dependent upon the material of construction, conventional landings which do not bottom out the pneudraulic shock absorber will not stroke the overload portion of the crash landing strut.

Another form which our invention may take is shown in FIGURE 3 whereby the mechanical portion of the compound shock absorber is contained within a metal outer cylinder 42 having a telescoping lower cylinder 44 for moving a metering pin 46 through an orifice 48 to displace fluid from a lower chamber 50 into a tubular chamber 52 thereabove for kinetic energy absorption. The lower chamber 50 and tubular chamber 52 are created by a fixed wall 54 with the inner cylinder being slidably associated with the wall 54. The uppermost surface 56 of the inner cylinder is arranged to abut a plate 58 thereabove immediately prior to the bottoming of the metering pin lower face with the orifice opening 48 to prevent shock absorber damage as mentioned in our other embodiment. The plate 58 separates a honeycomb chamber 60 within the uppermost portion of the outer cylinder 42 with a block of honeycomb 62 therein of metallic construction. Once again the honeycomb is shown to have its pores 90° out of face with the axis of the pneudraulic shock absorber in order to illustrate the type of construction. The tubular chamber 52 is charged with an air pressure by means of a fitting 64 that communicates with an axial opening 66 in a bolt 68 adapted to project beyond the uppermost surface of the outer cylinder 42 upon the collapse of the honeycomb block 62. The projection of the bolt 68 will provide an indication of the experiencing of an overload and will reveal the necessity for a detailed inspection to determine if the shock absorber is suitable for continued use.

If further use is available without changing the honeycomb block 62 a tube nut 70 is turned down the distance to again abut the uppermost surface of the outer cylinder 42 and by loosening a nut 72 adjacent the bottom of the inner cylinder 44 and turning a bolt 74 the position of the metering pin 46 may be changed an equivalent distance with respect to the orifice 48 to avoid changing strut absorption characteristics. However, it would be advisable to bleed off air pressure to permit the metering pin assembly relocation with subsequent repressurization to static position whereupon the shock absorber is ready for continued use. As an optional addition one could provide an electrical signal for visual and/or oral indication on an instrument panel of an associated vehicle for each and every one of the shock absorbers used thereon as would be readily obvious to those skilled in the art to which our invention relates.

Other objects and advantages will readily appear to those skilled persons, and, therefore, I do not wish to be limited by the foregoing description of the drawings but rather intend that the scope of our invention be defined by the appended claims.

We claim:
1. A shock absorber for a vehicle comprising:
a support structure affixed to said vehicle;
a first cylinder operatively connected to said support structure;
a second cylinder arranged to reciprocate in said first cylinder, said second cylinder containing a non-compressible fluid which is utilized to extend said second cylinder in accordance with a pressurized compressible fluid in said first cylinder such that only a portion of said first cylinder contains said non-compressible fluid in the extended position;
an adjustable metering means to meter the flow of non-compressible fluid into said first cylinder upon telescopic action of said second cylinder in said first cylinder;
a crush plate operatively connected to said first cylinder at the end opposite that mounted by said support structure;
a honeycomb member held between said crush plate and said support structure exteriorly of said first cylinder; and
a stop means connected to said second cylinder and arranged to contact said crush plate to compress said honeycomb upon the application of excessive loads.

2. A shock absorber for a vehicle comprising:
a tubular support structure affixed to said vehicle;
a honeycomb member arranged in said tubular support member adjacent the top thereof;
a crush plate underlying said honeycomb member;
a first cylinder having means to hold it, said crush plate and said honeycomb to said tubular support;
a second cylinder adapted to reciprocate in said tubular support and thereby cause displacement of fluid to said first cylinder under normal loading and contact said crush plate upon experiencing excessive loading; and
an adjustable metering means to meter the displacement of fluid to control normal energy absorption.

3. A shock absorber comprising:
a normally fixed cylinder;
a fluid filled cylinder having means to displace said fluid to said fixed cylinder upon the application of loads thereto;
a means to meter the displacement of said fluid to provide kinetic energy absorption of said loads including, a contoured member operatively connected to said fluid filled cylinder and adjustable externally of said shock absorber to position said contoured member within said fluid filled cylinder;
a yieldable means operatively arranged between said normally fixed cylinder and said fluid filled cylinder; and
means to engage said yieldable means immediately prior to or at the same time as bottoming of said means displacing fluid within said normally fixed cylinder to enable said shock absorber through said yieldable means to absorb loads in excess of the capabilities of said means metering displacement of fluid.

4. A shock absorber comprising:
a fluid shock absorber having a fixed cylinder, a telescoping cylinder, a fluid metering means and a means to vary a volume for fluids within said shock absorber, which means to vary a volume is arranged to be adjusted externally of said shock absorber;
a yieldable means operatively connected to said shock absorber and arranged to mechanically absorb loads in excess of the capabilities of said fluid shock absorber including an extensible means to provide a visual indication of the actuation of said yieldable means.

5. A shock absorber for a vehicle comprising:
a support structure adapted to be affixed to the vehicle;
a first cylinder;
a yieldable means operatively connected to said support structure and said first cylinder in spaced relation including an indicator device which provides visual indication of the spacing of said support structure and said first cylinder;
a second cylinder operatively connected to said first cylinder to provide two variable volume chambers containing a compressible fluid and a non-compressible fluid such that said pressure is generated to extend said first and second cylinders and compressibly hold said yieldable means between said support structure and said first cylinder; and means to control fluid communication between said variable volume chambers.

6. A shock absorber according to claim 5 wherein said means to control fluid communication between said variable volume chambers includes an adjustable metering means to reduce the volume of one of said variable volume chambers in accordance with any deformation of said yieldable means to maintain operative pressures in said first and second cylinders.

References Cited by the Examiner

UNITED STATES PATENTS

| | | | |
|---|---|---|---|
| 1,912,840 | 6/1933 | Havill | 244—104 |
| 1,992,569 | 2/1935 | Doty | 188—96 |
| 2,728,479 | 12/1955 | Wheeler | 188—1 |
| 2,814,482 | 11/1957 | Anderson et al. | 244—104 |
| 2,825,553 | 3/1958 | Smith et al. | 244—104 |
| 3,032,302 | 5/1962 | Clark | 244—138 |
| 3,083,693 | 4/1963 | Kunz | 188—96 |

ARTHUR L. LA POINT, *Primary Examiner.*

H. R. FIELD, R. M. WOHLFARTH,
*Assistant Examiners.*